(12) United States Patent
Schulte et al.

(10) Patent No.: US 9,377,138 B2
(45) Date of Patent: Jun. 28, 2016

(54) THREADED CONNECTIONS AND METHODS (75) Inventors: Warren Harold Schulte, Porter, TX (US); Aubrey Coy Reece, Kingwood, TX (US)

(73) Assignee: HOUSTON INTERNATIONAL SPECIALTY, INC., Spring, TX (US)

( * ) Notice: Subject to any disclaimer, the term of this patent is extended or adjusted under 35 U.S.C. 154(b) by 440 days.

(21) Appl. No.: 12/925,430

(22) Filed: Oct. 21, 2010

(65) Prior Publication Data

US 2012/0098256 A1    Apr. 26, 2012

(51) Int. Cl.
*F16L 15/00* (2006.01)
*F16L 15/06* (2006.01)

(52) U.S. Cl.
CPC .............. *F16L 15/004* (2013.01); *F16L 15/06* (2013.01)

(58) Field of Classification Search
USPC ................................. 285/333–334, 355, 390
See application file for complete search history.

(56) References Cited

U.S. PATENT DOCUMENTS

| | | | |
|---|---|---|---|
| 2,107,716 A * | 2/1938 | Singleton | 285/148.19 |
| 3,989,284 A * | 11/1976 | Blose | 285/332.2 |
| 4,537,429 A * | 8/1985 | Landriault | 285/334 |
| 4,570,982 A | 2/1986 | Blose et al. | |
| 4,591,195 A * | 5/1986 | Chelette et al. | 285/332.3 |
| 4,662,659 A | 5/1987 | Blose et al. | |
| 4,707,001 A | 11/1987 | Johnson | |
| 4,753,460 A | 6/1988 | Tung | |
| 4,915,426 A | 4/1990 | Skipper | |
| 5,348,350 A | 9/1994 | Blose et al. | |
| 5,462,315 A | 10/1995 | Klementich | |
| 5,769,466 A | 6/1998 | Noel et al. | |
| 5,788,401 A * | 8/1998 | Drenth | 403/343 |
| 5,829,797 A | 11/1998 | Yamamoto et al. | |
| 6,027,145 A * | 2/2000 | Tsuru et al. | 285/94 |
| 6,454,315 B1 | 9/2002 | Yamaguchi | |
| 2003/0234538 A1* | 12/2003 | Hashem | 285/333 |
| 2004/0174017 A1 | 9/2004 | Brill et al. | |
| 2004/0194278 A1 | 10/2004 | Brill et al. | |
| 2005/0184521 A1 | 8/2005 | Maguire | |
| 2005/0248153 A1 | 11/2005 | Sugino et al. | |
| 2006/0006648 A1 | 1/2006 | Grimmett et al. | |
| 2007/0228729 A1 | 10/2007 | Grimmett et al. | |
| 2008/0296894 A1 | 12/2008 | Bailey et al. | |
| 2009/0058085 A1 | 3/2009 | Breihan et al. | |
| 2010/0078936 A1 | 4/2010 | Nakamura et al. | |
| 2010/0187808 A1 | 7/2010 | Santi et al. | |

OTHER PUBLICATIONS

PCT International Search Report for Patent Application No. PCT/US2011/001785, dated Mar. 13, 2012 (14 pages).

* cited by examiner

*Primary Examiner* — Aaron Dunwoody
*Assistant Examiner* — Fannie Kee (57) ABSTRACT

Couplings and/or connections include a female component engaged with a male component. A first shoulder of the female component abuts a first complementary shoulder of the male component to form a first radial seal. A second shoulder of the female component abuts a second complementary shoulder of the male component to form a second radial seal. A sealing surface of the female component abuts a complementary sealing surface of the male component to form an axial seal disposed between the first and second radial seals. Plastic and/or elastic deformation of the complementary sealing surface of the male component forms an axial seal between the female component and the male component.

19 Claims, 5 Drawing Sheets

THREADED CONNECTIONS AND METHODS

FIELD

Embodiments of the present invention relate, generally, to couplings, such as threaded connections, and similar connections between tubular conduit segments and other members, and methods of forming such couplings.

BACKGROUND

Conventionally, threaded connections between oilfield tubulars and similar conduits, pipes, and/or other engageable members are formed by providing a large torque to complimentary male and female threaded members. The magnitude of the force used to form the connection can vary depending on the dimensions and/or tolerance of the members. During use, conduits used to contain fluid flow must be connected using a torque sufficient to form a fluid-tight seal therebetween. Conduits that must withstand significant fluid pressures, such as drill pipe and other oilfield tubulars, require a significant torque (up to 50,000 foot-pounds, or more) to form such a seal. Even when properly torqued, multiple, redundant seals are often required to ensure integrity under anticipated fluid pressures without permitting damage to the components.

Application of significant torque to conventional tubular components can cause galling, stripping, and/or cross-threading of the threads. Galling and similar destructive deformation can create difficulty when attempting to disengage a threaded connection, and can prevent reuse of the deformed tubular components. Typically, to reduce and/or prevent galling, tubular threads must be treated, such as through application of a coating of tin, zinc, or other metals and/or alloys, or by "sugar blasting" the threads with fine grains of sand. Additionally, many tubular components utilize specialized thread configurations, having thread and/or stab flank and load flank angles selected to reduce galling while maintaining intimate contact between associated threaded portions, and allowing for radial expansion of the connection. When a threaded connection is placed under a significant lateral and/or bending force, such as when used within a directional borehole, one or more of the threads can become disengaged, hindering the integrity of the connection and seal. Buttress threads having a negative load flank angle can be used to facilitate retaining the connection between threaded components.

A need exists for a coupling having a configuration of sealing surfaces that provides a fluid-tight integrity exceeding that of conventional threaded connections.

A need also exists for a coupling having a configuration of components that enables a connection to be formed without galling or damaging the mechanical strength of the threads or otherwise undesirably deforming any of the components, while maintaining the fluid-tight integrity and stability of the threaded connection.

A further need exists for a coupling having a configuration that allows for radial expansion of components without causing damage or undesired deformation of the components, or hindering the integrity of the connection.

Embodiments of the present invention meet these needs.

SUMMARY

Embodiments of the present invention relate to a connection and/or coupling between a first member and a second member for enabling the flow of fluid therebetween. While the preferred embodiments of the invention described herein relate to a threaded connection between tubular members for use in the oil and gas industry, such as segments of drill pipe or casing, it should be understood that embodiments of the present invention are usable with any manner of connection, including those between other types of threaded members, and couplings that incorporate use of one or more non-threaded methods of connection.

In a preferred embodiment of the invention, a female component (i.e. a tubular member having a threaded box end), having an operative end for connection with an adjacent tubular member, is engaged with a male component (i.e. a tubular member having a threaded pin end). The operative end of the female component has a first shoulder disposed at the operative end, a second shoulder spaced from the first shoulder, and a sealing surface or land between the first and second shoulders. The distal end of the male component includes a first complementary shoulder adapted to abut the first shoulder of the female component, a second complementary shoulder adapted to abut the second shoulder of the female component, and a complementary sealing surface or land adapted to seal against the sealing surface of the female component.

When the male and female components are engaged and torqued, the first complementary shoulder of the male component abuts the first shoulder of the female component to form a first radial seal. Similarly, the second complementary shoulder of the male component abuts the second shoulder of the female component to form a second radial seal. Between the first and second radial seals, contact between the sealing surface of the female component and the complementary sealing surface of the male component forms an axial seal. The resulting sealing arrangement, which includes an axial seal disposed between two radial seals, can provide a connection capable of withstanding torque and/or fluid pressures far in excess of conventional connections, up to 50,000 foot-pounds, or more. In an embodiment, one or more O-rings, gaskets, rubber elements, and/or similar bands, rings, or other sealing and/or compressible elements can be provided in the sealing areas to enhance formation of the radial and/or axial seals. However, metal-to-metal seals are also usable.

In a preferred embodiment of the invention, abutment between the first shoulder of the female component and the first complementary shoulder of the male component, and/or abutment between the second shoulder and the second complementary shoulder, can cause deformation of the complementary sealing surface of the male component. This deformation can increase the contact area and contact pressure between the complementary sealing surface of the male component and the sealing surface of the female component, facilitating formation of the axial seal. Additionally, deformation of the distal end of the male component in this manner can prevent galling and/or deformation of the threads of the male and female components when torque is applied, as the torquing of the components instead causes deformation of the distal end of the male component.

While in an embodiment, the deformation of the male component can be an elastic deformation, it should also be understood that deformation of the male component in this manner can include a plastic deformation. Conventionally, plastic deformation of components, especially oilfield tubulars and similar members, is though to be undesirable, as plastic deformation normally causes a loss of integrity and prevents reuse of the deformed object. However, plastic deformation of the distal end of the male component in the manner described above does not prevent reuse of the male component, but instead facilitates reuse by preventing galling or stripping of the threads. Additionally, plastic deformation of the distal end of the male component does not impair the effectiveness of the coupling, but in fact, increases the effectiveness of the coupling by facilitating the formation of an axial seal.

To further enhance the quality of the coupling, the male and/or female components can include threads having a load flank with a negative angle relative to the longitudinal axis off the male and/or female components, thereby enabling tension, compression, and/or bending of the coupling without causing disengagement of the components. Use of a negative angled load flank can also improve the strength of the fluid tight connection, and facilitate prevention of galling or stripping of the threads.

When it is desired to disengage the coupling, a reverse torque can be applied to the male and/or female component that is sufficient to break the radial seals and the axial seal. Then, the threads can be smoothly disengaged due to the lack of galling therebetween.

Embodiments described herein thereby provide connections and/or couplings having a configuration of sealing surfaces that provides improved fluid-tight integrity, such as the placement of an axial seal between first and second radial seals. Embodiments described herein further provide connections and/or couplings that can be torqued without galling and/or otherwise damaging threads or other portions of the components. Embodiments described herein can also be plastically and/or elastically deformed to enhance the sealing relationship between adjacent components, while preventing deformation of other portions of the components.

BRIEF DESCRIPTION OF THE DRAWINGS

In the detailed description of various embodiments of the present invention presented below, reference is made to the accompanying drawings, in which.

Embodiments of the present invention are described below with reference to the listed Figures.

DETAILED DESCRIPTION OF THE EMBODIMENTS

Before describing selected embodiments of the present invention in detail, it is to be understood that the present invention is not limited to the particular embodiments described herein. The disclosure and description of the invention is illustrative and explanatory of one or more presently preferred embodiments of the invention and variations thereof, and it will be appreciated by those skilled in the art that various changes in the design, organization, order of operation, means of operation, equipment structures and location, methodology, and use of mechanical equivalents, as well as in the details of the illustrated construction or combinations of features of the various elements, may be made without departing from the spirit of the invention.

As well, the drawings are intended to describe the concepts of the invention so that the presently preferred embodiments of the invention will be plainly disclosed to one of skill in the art, but are not intended to be manufacturing level drawings or renditions of final products and may include simplified conceptual views as desired for easier and quicker understanding or explanation of the invention. As well, the relative size and arrangement of the components may differ from that shown and still operate within the spirit of the invention as described throughout the present application.

Moreover, it will be understood that various directions such as "upper", "lower", "bottom", "top", "left", "right", and so forth are made only with respect to explanation in conjunction with the drawings, and that the components may be oriented differently, for instance, during transportation and manufacturing as well as operation. Because many varying and different embodiments may be made within the scope of the inventive concept(s) herein taught, and because many modifications may be made in the embodiments described herein, it is to be understood that the details herein are to be interpreted as illustrative and non-limiting.

Figure 1:
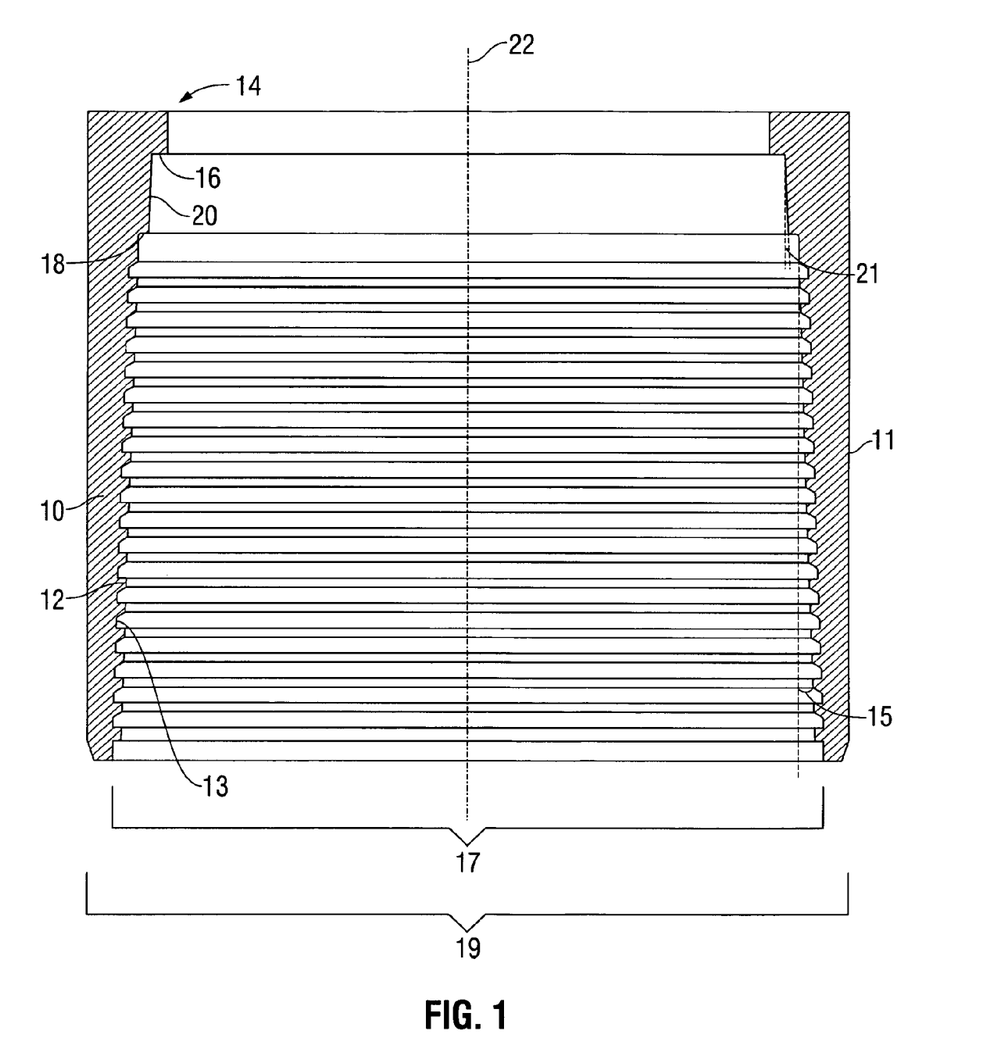
FIG. 1 depicts a cross-sectional view of a female component of a threaded coupling usable within the scope of the present disclosure.

Referring now to FIG. 1, a cross sectional view of a female component (10) having interior threads (12) (i.e. a threaded box end) is shown. Specifically, the female component (10) includes a generally straight outer surface (11), and a tapered inner surface (13) having the threads (12) thereon. The angle (15) of the tapered inner surface (13) can vary, depending on the desired flow capacity and tolerance to be accommodated by the inner diameter (17) and outer diameter (19) of the female component (10), and by the threads (12).

Figure 5:
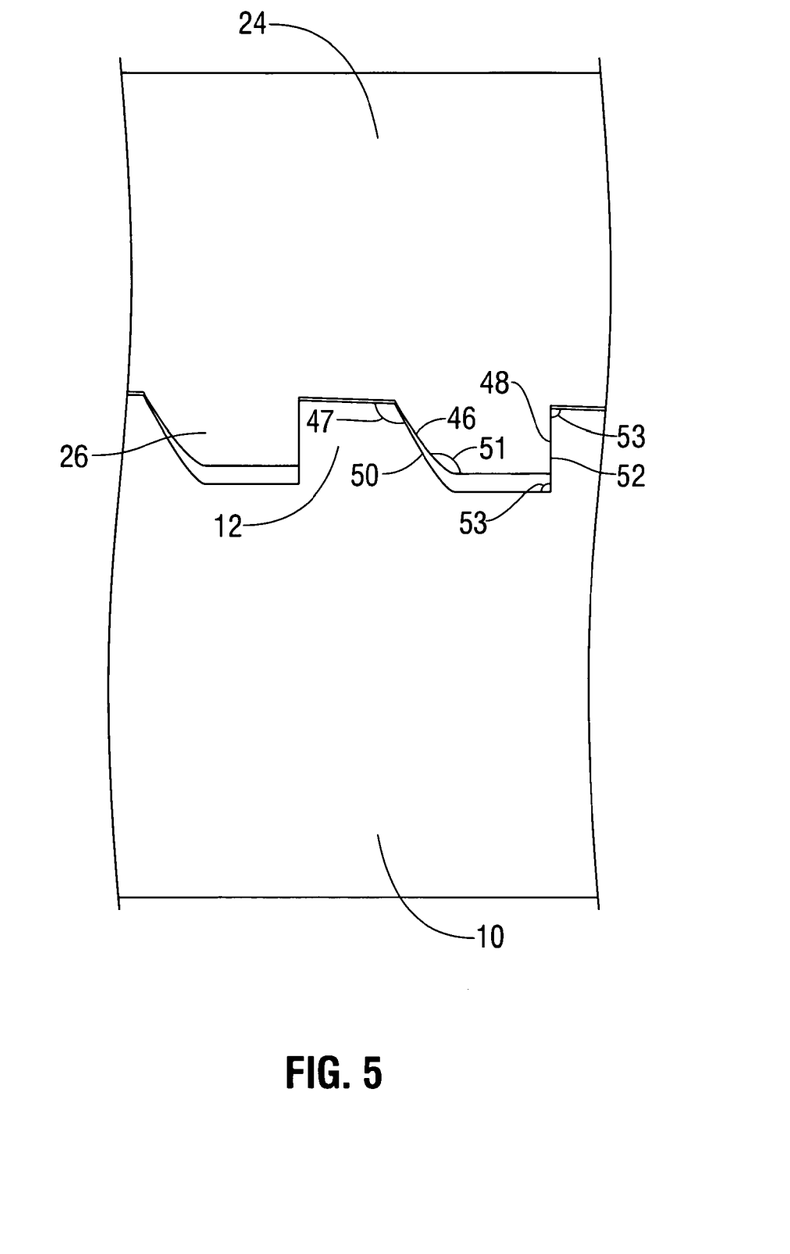
FIG. 5 depicts a diagrammatic view of an embodiment of the threads of the connection of FIG. 3.

While any variety of threads are usable within the scope of the present disclosure, FIG. 1 depicts the interior threads (12) as modified buttress threads, having a load flank with a negative angle (depicted in FIG. 5). Further, while any variety of threaded component or other manner of engageable member can be used, FIG. 1 depicts the female component (10) as a tubular member for use in oil and gas operations (i.e. a segment of twelve-inch diameter drill pipe).

Figure 2:
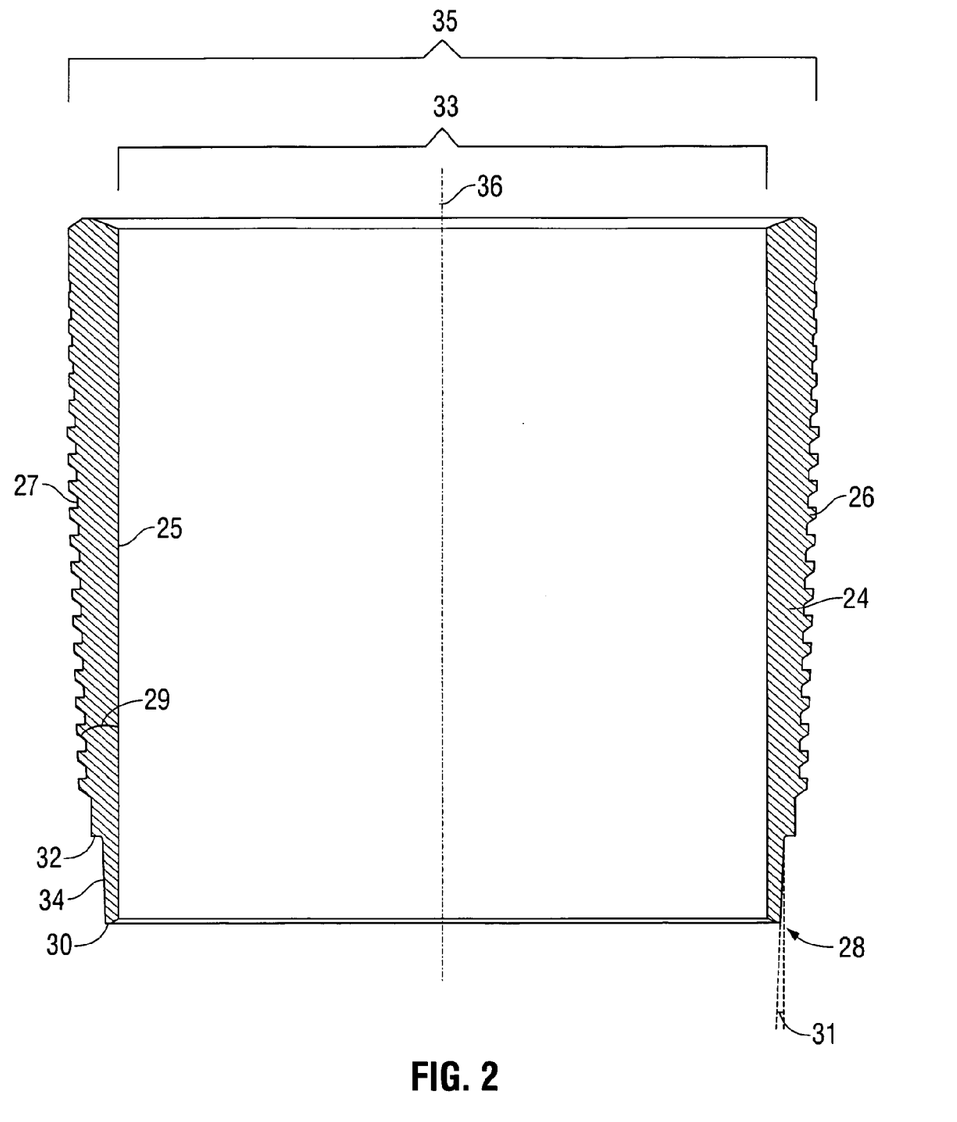
FIG. 2 depicts a cross-sectional view of a male component of a threaded coupling usable within the scope of the present disclosure.
Figure 3:
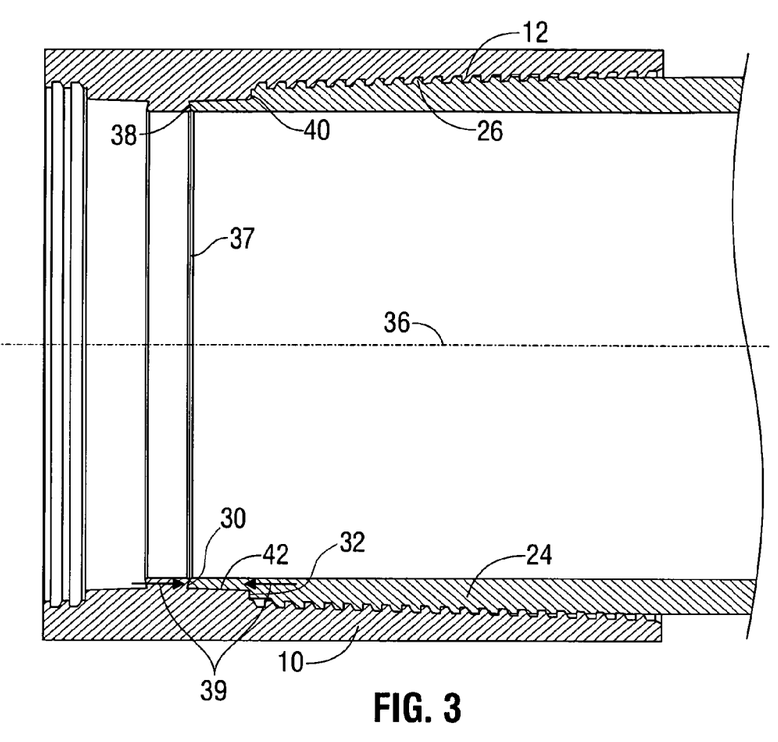
FIG. 3 depicts a cross-sectional view of an embodiment of a connection formed through engagement between the female component of FIG. 1 and the male component of FIG. 2.

The female component (10) includes an operative end (14) adapted for engagement with an adjacent male component (depicted in FIGS. 2 and 3). The operative end (14) includes a first shoulder (16) spaced apart from a second shoulder (18) with a sealing surface (20) disposed therebetween. When engaged with a male component, complementary shoulders of the male component abut the first and second shoulders (16, 18) of the female component (10) to form radial seals (depicted in FIG. 3). Additionally, a complementary sealing surface of the male component abuts the sealing surface (20) of the female component to form an axial seal (depicted in FIG. 3). While FIG. 1 depicts the first and second shoulders (16, 18) as generally perpendicular to the longitudinal axis (22) of the female component (10) for illustrative purposes, it should be understood that the first and second shoulders (16, 18) can be provided with any desired angles (e.g. a fifteen degree shoulder) to facilitate engagement with, and retention of, complementary shoulders of a male component engaged therewith. Similarly, the sealing surface (20) can be offset from the longitudinal axis (22) of the female component (10) by a selected angle (21) to facilitate formation of the axial seal.

FIG. 2 depicts a cross sectional view of a male component (24) having exterior threads (26) (i.e. a threaded pin end), complementary to the interior threads of the female component, shown in FIG. 1. Specifically, the male component (24)

is shown including a generally straight inner surface (25), and a tapered outer surface (27) having the threads (26) thereon. The angle (29) of the tapered outer surface (27) can be complementary to or otherwise adapted to threadably engage with the female component (shown in FIG. 1), as can the inner diameter (33) and outer diameter (35) of the male component (24).

The male component (24) includes a distal end (28) adapted for engagement with the operative end of the female component, shown in FIG. 1. Specifically, the distal end (28) is depicted having a first complementary shoulder (30) formed thereon, and a second complementary shoulder (32) spaced from the first complementary shoulder (30), with a complementary sealing surface (34) disposed therebetween. In use, when the male component (24) is engaged with a female component, the first complementary shoulder (30) abuts the first shoulder (16, shown in FIG. 1) of the female component, the second complementary shoulder (32) abuts the second shoulder (18, shown in FIG. 1) of the female component, and the complementary sealing surface (34) abuts the sealing surface (20, shown in FIG. 1) of the female component. As described previously, while the first and second complementary shoulders (30, 32) are shown generally perpendicular to the longitudinal axis (36) of the male component (24), the first and second complementary shoulders (30, 32) can be provided with any desired angle complementary to and/or able to engage the shoulders of the female component. Similarly, it should be understood that the complementary sealing surface (34) can be angularly offset from the longitudinal axis (36) by a selected angle (31) to facilitate formation of an axial seal with the sealing surface of the female component, e.g. to enable the complementary sealing surface (34) to function as an axial shoulder.

Referring now to FIG. 3, an embodiment of a connection (37) is shown, defined by the threaded coupling between the exterior threads (26) of the male component (24) and the interior threads (12) of the female component (10). The connection can be formed by inserting the male component (24) into the female component (10), engaging the threads, such as through rotation, then providing sufficient torque such that the first and second complementary shoulders (shown in FIG. 2) of the male component (24) abut the first and second shoulders (shown in FIG. 1) of the female component (10). Application of torque to the components (10, 24) can cause a compressive force (39) such that abutment between the first complementary shoulder (30) of the male component (24) and the first shoulder of the female component (10) forms a first radial seal (38) when one or both components (10, 24) are torqued. Similarly, abutment between the second complementary shoulder (32) of the male component (24) and the second shoulder of the female component (10) forms a second radial seal (40). Additionally, contact between the sealing surface of the female component (10) and the complementary sealing surface of the male component (24) forms an axial seal (42) between the first and second radial seals (38, 40). The depicted sealing configuration, which includes an axial seal (42) disposed between first and second radial seals (38, 40), can withstand torque and/or fluid pressures in excess of conventional connections.

Figure 4:
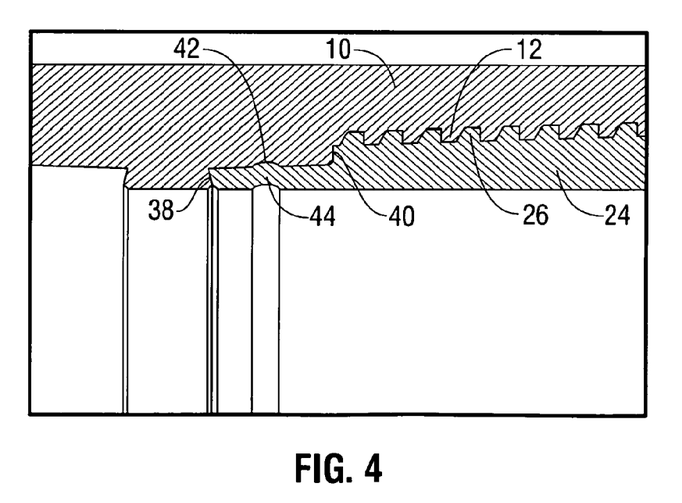
FIG. 4 depicts a magnified view of the connection of FIG. 3.

FIG. 4 depicts a magnified view of the connection of FIG. 3, showing the first and second radial seals (38, 40) and the axial seal (42) between the male and female components (24, 10). As described previously, torquing of the male and/or female components (24, 10) can cause deformation of the complementary sealing surface of the male component (24), resulting in a protruding region (44) that will contact the sealing surface of the female component (10). The protruding region (44) facilitates formation of the axial seal, while also preventing galling of the threads of both the male and female components (24, 10). It should be understood that while FIG. 4 depicts an exaggerated protruding region (44) for illustrative purposes, a generally small amount of deformation of the male component (24) can form a strong axial seal and prevent deformation of the threads. In various embodiments of the invention, the deformation of the male component (24) can include either elastic or plastic deformation without negatively affecting integrity or reusability of the male and female components (24, 10). Further, deformation of the male component (24) in the manner described can enhance the integrity of the coupling, and can facilitate reuse of the components (24, 10) by preventing galling or stripping of the threads.

Figure 6:
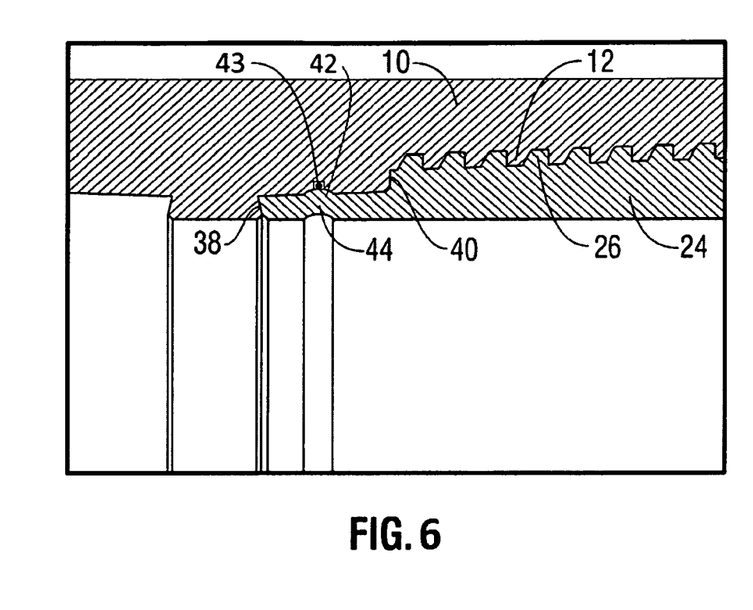
FIG. 6 depicts a magnified view of the connection of FIG. 3 and showing a sealing element disposed on the female component.

FIG. 6 depicts a magnified view of the connection of FIG. 3, showing the first and second radial seals (38, 40) and the axial seal (42) between the male and female components (24, 10), further comprising an elastic, deformable, or compressible sealing element (43) disposed on the female component (10). The sealing element may comprise one or more O-rings, gaskets, rubber elements, and/or similar bands, rings, or other sealing and/or compressible elements.

Referring now to FIG. 5, a diagrammatic view of an embodiment of the engagement between the interior threads (12) of the female component (10) and the exterior threads (26) of the male component (24) is shown. The interior threads (12) are shown having a thread and/or stab flank (46) and a load flank (48). Similarly, the exterior threads (26) are shown having a complementary thread and/or stab flank (50) and a complementary load flank (52). The thread flanks (46, 50) are shown having sloped angles (47, 51), such as 25-35 degrees from the perpendicular to the longitudinal axis of the components (10, 24) (115-125 degrees from the longitudinal axis). A positive thread flank angle generally facilitates easy engagement and rotation of the components. The load flanks (48, 52) are shown having a small negative angle (53, 54), such as an angle ranging from negative 1 to negative 5 degrees from the perpendicular to the longitudinal axis of the components (10, 24), such that when the threads (12, 26) are engaged, the load flanks (48, 52) have an overlapping vertical relationship. The complementary negative load flank angles thereby provide a stronger engagement between the mating threads than a positive load flank angle, and prevent disengagement of the mating threads when the connection is subjected to bending forces. While the angles of the thread flanks (46, 50) and load flanks (48, 52) can be varied, generally, a larger negative angle of the load flanks (48, 52) results in a larger positive angle of the thread flanks (46, 50) being preferable to facilitate engagement of the threads. Generally, a small negative load flank angle, such as negative 3 to negative 5 degrees, provides a superior engagement without necessitating use of a thread flank angle that would be difficult to create or utilize.

Embodiments of the present invention thereby provide connections and/or couplings having a configuration of sealing surfaces that provides improved fluid-tight integrity, such as the placement of an axial seal between first and second radial seals, while reducing or eliminating galling and/or destructive deformation of the threads, such as through plastic and/or elastic deformation of the components.

While various embodiments of the present invention have been described with emphasis, it should be understood that within the scope of the appended claims, the present invention might be practiced other than as specifically described herein.

What is claimed is:

1. A threaded connection comprising:
   a female component having interior threads, an operative end, a first shoulder disposed at the operative end, a second shoulder spaced from the first shoulder, and a sealing surface disposed between the first shoulder and the second shoulder; and
   a male component having exterior threads adapted for threadably engaging the female component, the male component having an end, wherein the end comprises a first complementary shoulder adapted to abut the first shoulder of the female component, a second complementary shoulder adapted to abut the second shoulder of the female component, and a complementary sealing surface disposed between the first complementary shoulder and the second complementary shoulder and adapted to seal against the sealing surface of the female component,
   wherein application of torque to the female component, the male component, or combinations thereof causes abutment between the first shoulder and the end of the male component comprising the first complementary shoulder to form a first radial seal between the female component and the male component,
   wherein application of torque to the female component, the male component, or combinations thereof causes abutment between the second shoulder and the second complementary shoulder to form a second radial seal between the female component and the male component,
   wherein application of torque to the female component, the male component, or combinations thereof causes contact between the sealing surface and the complementary sealing surface to form an axial seal between the female component and the male component, and
   wherein the female component and the male component comprise threads having a load flank with a negative angle relative to a longitudinal axis of the female component and the male component for enabling tension, compression, and bending of the threaded connection while retaining engagement between the female component and the male component.

2. The threaded connection of claim 1, wherein abutment between the first shoulder and the first complementary shoulder, the second shoulder and the second complementary shoulder, or combinations thereof, deforms the complementary sealing surface of the male component, thereby increasing contact area and contact pressure between the sealing surface and the complementary sealing surface and facilitating formation of the axial seal between the female component and the male component.

3. The threaded connection of claim 2, wherein abutment between the first shoulder and the first complementary shoulder, the second shoulder and the second complementary shoulder, or combinations thereof, plastically deforms the complementary sealing surface.

4. The threaded connection of claim 2, wherein abutment between the first shoulder and the first complementary shoulder, the second shoulder and the second complementary shoulder, or combinations thereof, elastically deforms the complementary sealing surface.

5. The threaded connection of claim 1, wherein the sealing surface, the complementary sealing surface, or combinations thereof, is angularly offset from a longitudinal axis of the threaded coupling.

6. The threaded connection of claim 1, wherein the first radial seal, the second radial seal, the axial seal, or combinations thereof, comprises an elastic, deformable, or compressible sealing element disposed therein.

7. A connection between a first member and a second member, the connection comprising:
   the first member comprising a male component having an end with exterior threads and the second member comprising a female component with interior threads, wherein the female component and the male component comprise threads having a load flank with a negative angle relative to a longitudinal axis of the female component and the male component for enabling tension, compression, and bending of the threaded coupling while retaining engagement between the female component and the male component;
   a first radial seal formed through abutment between the end of the first member and a first shoulder of the second member;
   a second radial seal formed through abutment between a complementary shoulder of the first member and a second shoulder of the second member; and
   an axial seal disposed between the first radial seal and the second radial seal, wherein the axial seal is formed through deformation of the end of the first member to cause increased contact between the first member and the second member.

8. The connection of claim 7, wherein abutment between the end of the first member and the first shoulder of the second member, the second shoulder and the complementary shoulder, or combinations thereof, deforms the end of the first member to cause the increased contact area and contact pressure between the first member and the second member and facilitates formation of the axial seal between the first member and the second member.

9. The connection of claim 8, wherein abutment between the end of the first member and the first shoulder of the second member, the second shoulder and the complementary shoulder, or combinations thereof, plastically deforms the end of the first member.

10. The connection of claim 8, wherein abutment between the end of the first member and the first shoulder of the second member, the second shoulder and the complementary shoulder, or combinations thereof, elastically deforms the end of the first member.

11. The connection of claim 7, wherein the first radial seal, the second radial seal, the axial seal, or combinations thereof, comprise an elastic, deformable, or compressible sealing element disposed therein.

12. A connection between a first member and a second member, the connection comprising:
   a longitudinal axis;
   a female component on the second member having a plurality of shoulders and a land disposed between a first shoulder and a second shoulder of the plurality of shoulders, wherein the land is offset from the longitudinal axis by a first angle; and
   a male component on the first member having a plurality of complementary shoulders and a complementary land disposed between a first complementary shoulder and a second complementary shoulder of the plurality of complementary shoulders, wherein the complementary land is offset from the longitudinal axis by a second angle, the male component comprising exterior threads and the female component comprising interior threads, wherein the female component and the male component comprise threads having a load flank with a negative angle relative to a longitudinal axis of the female component and the male component for enabling tension, compression, and bending of the interior threads and exterior threads of the connection while retaining engagement between the female component and the male component, wherein the land and the complementary land abut to form a seal when the female component and the male component are engaged such that the first shoulder abuts the first complementary shoulder and the second shoulder abuts the second complementary shoulder, and wherein the complementary land is deformed through abutment of the shoulders with the complementary shoulders to cause increased contact area and contact pressure between the first member and the second member to facilitate formation of the seal.

13. A threaded connection comprising:

a female component having interior threads, a first shoulder, a second shoulder spaced from the first shoulder, and a sealing surface disposed between the first shoulder and the second shoulder; and a male component having exterior threads adapted for threadably engaging the female component, a first complementary shoulder adapted to abut the first shoulder of the female component, a second complementary shoulder adapted to abut the second shoulder of the female component, and a complementary sealing surface disposed between the first complementary shoulder and the second complementary shoulder and adapted to seal against the sealing surface of the female component, wherein application of torque to the female component, the male component, or combinations thereof causes abutment between the first shoulder and the first complementary shoulder to form a first radial seal between the female component and the male component, wherein application of torque to the female component, the male component, or combinations thereof causes abutment between the second shoulder and the second complementary shoulder to form a second radial seal between the female component and the male component, wherein application of torque to the female component, the male component, or combinations thereof causes contact between the sealing surface and the complementary sealing surface to form an axial seal between the female component and the male component, and wherein the first shoulder and the first complementary shoulder, the second shoulder and the second complementary shoulder, or combinations thereof, comprise a surface extending at a negative angle relative to a longitudinal axis of the male component.

14. The threaded connection of claim 13, wherein abutment between the first shoulder and the first complementary shoulder, the second shoulder and the second complementary shoulder, or combinations thereof, increases contact pressure between the sealing surface and the complementary sealing surface.

15. The threaded connection of claim 14, wherein abutment between the first shoulder and the first complementary shoulder, the second shoulder and the second complementary shoulder, or combinations thereof, increases contact pressure between the first shoulder and the first complementary shoulder, the second shoulder and the second complementary shoulder.

16. The threaded connection of claim 14, wherein abutment between the first shoulder and the first complementary shoulder, the second shoulder and the second complementary shoulder, or combinations thereof, mechanically strains the first shoulder and the first complementary shoulder, the second shoulder and the second complementary shoulder, or combinations thereof.

17. The threaded connection of claim 13, wherein the female component and the male component comprise threads having a load flank with a negative angle relative to a longitudinal axis of the female component and the male component for enabling tension, compression, or bending of the threaded coupling while retaining engagement between the female component and the male component.

18. The threaded connection of claim 13, wherein at least one of the sealing surface and the complementary sealing surface, is angularly offset in relation to the other of the sealing surface and the complementary surface.

19. The threaded connection of claim 13, wherein the first radial seal, the second radial seal, the axial seal, or combinations thereof, comprise an additional elastomeric or metallic sealing element disposed therein.

* * * * *